Jan. 8, 1946.  J. Y. DAHLSTRAND  2,392,313
RIGHT ANGLE TRANSMISSION UNIT
Filed March 16, 1944

Inventor
Josef Y. Dahlstrand
By Semmes Keegin Beale & Semmes
Attorneys

Patented Jan. 8, 1946

2,392,313

UNITED STATES PATENT OFFICE 2,392,313

RIGHT ANGLE TRANSMISSION UNIT

Josef Y. Dahlstrand, Indianapolis, Ind.

Application March 16, 1944, Serial No. 526,726

1 Claim. (Cl. 74—420)

This invention relates to power transmission devices and more especially to speed reducing gearing. More specifically the invention relates to gear type speed reducer adapted to be used in connection with high speed prime movers such as steam turbines, and having input and output shafts arranged at an angle to each other.

It is customary when substantially low speed reductions are required, to couple the input and output shafts of the above type units by means of bevel gears. This type of gearing operates at high efficiency at relatively low speeds but because of their inherent characteristics they cannot be satisfactorily employed at speeds in excess of 1200 to 1500 R. P. M. especially in the larger sizes of gears. Pitch line speeds below 5000 feet per minute must be maintained to avoid excessive noise levels. This is true with both straight tooth bevel gears and those having spiral teeth such as hypoid gears.

On the other hand, quiet, vibrationless operation may be obtained from straight helical or herringbone gears at extremely high speeds, for instance as high as 40,000 R. P. M. I have found that by first reducing the velocity of the bevel gearing by means of a reducing train of helical gears, bevel gearing may be satisfactorily employed in transmitting the power of a high speed prime mover.

It is therefore one of the principal objects of this invention to provide a power transmission unit employing bevel gears for imparting torque from one shaft to another and having means for initially reducing the speed at which the bevel gears rotate to speeds commensurate with the optimum operating characteristics of such gears to thereby permit their use in connection with the transmission of power from high speed prime movers.

Another object of the invention is to provide a power transmission unit for use with high speed prime movers and employing bevel gears for operatively connecting intersecting shafts, said unit including an input stage of reduction gearing having a tooth arrangement suitable for operation at the high speeds developed by such prime movers.

Yet another object of the invention is to provide a right angle power transmission unit for use with high speed prime movers comprising a speed reducing input stage of gearing consisting of helical gears, an intermediate stage of gearing consisting of spiral toothed bevel gears, and an output speed increasing stage of gearing consisting of helical gears.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claim.

In order to make my invention more clearly understood, I have shown in the accompanying drawing means for carrying the same into practical effect without limiting the improvements in their useful applications to the particular constructions which, for the purpose of explanation, have been made the subject of illustration.

Figure 1:
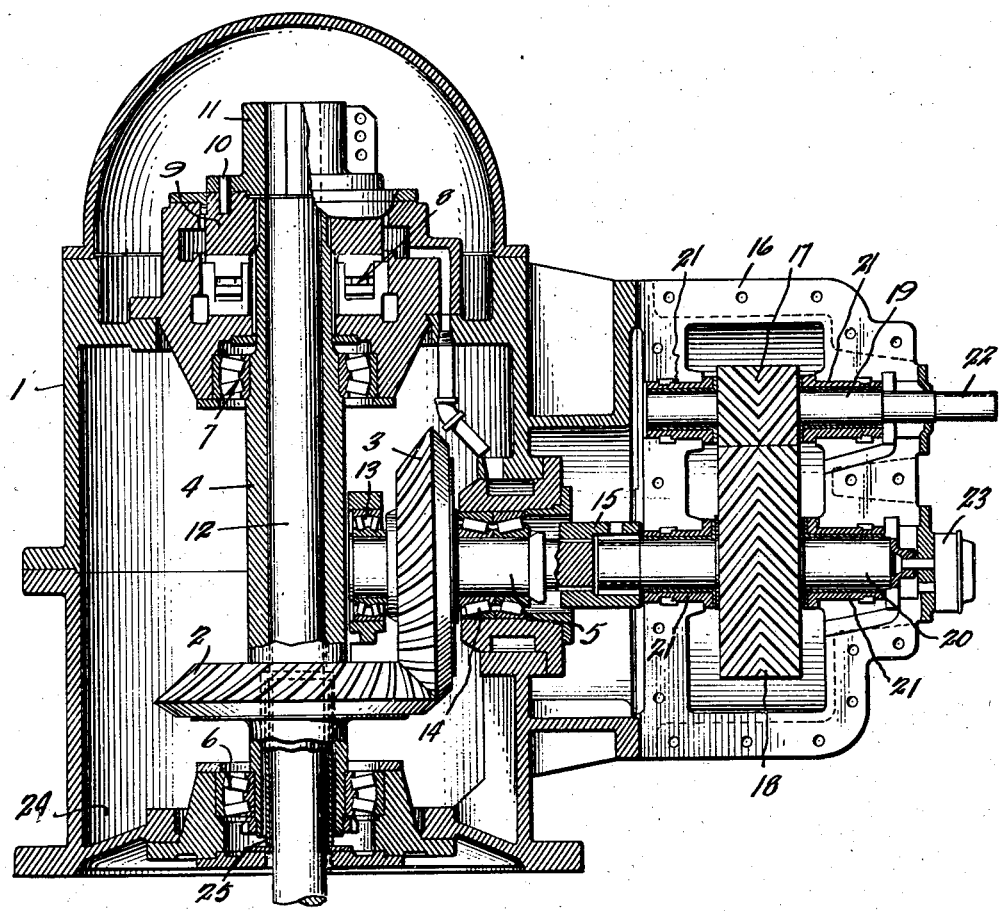
Figure 1 represents a transverse sectional view, parts being shown in elevation, of a speed reducing transmission unit constructed in accordance with this invention.

Referring more particularly to the drawing, there is shown in Figure 1 a power transmission unit of a type adapted for the transmission of power for operating a deep well rotary pump. The particular unit shown is by way of illustration only, as the principle involved in this invention may be employed wherever bevel gearing is used in the transmission of power from a high speed source. In the particular embodiment shown, the bevel or output stage of gearing is housed in an inclosed casing 1 and comprises intermeshing bevel gears 2 and 3, respectively mounted on intersecting shafts 4 and 5. Preferably, the bevel gears 2 and 3 are of the spiral tooth or hypoid type. The shaft 4, or the output shaft, is a hollow shaft or quill and is journaled in anti-friction roller bearings, designated generally as 6 and 7, supported within the casing 1 respectively at the upper and lower end thereof. When the unit is employed under conditions where high power loads may be imposed on the output shaft as in the case of deep-well pumps, a suitable bearing such as the Kingsbury bearing conventionally shown at 8 may also be used.

Carried by the upper end of the quill 4 is a flange member 9 which has connected therewith, by means such as shear pins 10, a flanged socket 11 adapted to receive and drive one end of a coupling shaft 12, the opposite end of which is adapted to be connected with and drive the pump.

The bevel gear shaft 5 is likewise journaled in roller bearings 13 and 14, also supported within the casing 1. This shaft 5 projects from the casing 1 and is provided on the projecting end with a suitable coupling element 15.

Connected to the side of a casing 1 is a second casing 16 for housing the input or speed reducing stage of gearing which consists of an input high speed pinion 17, and an intermeshing low-speed gear 18. These gears are provided with helical teeth, preferably in a herringbone arrangement. This type of gearing operates at a very high R. P. M. and has been found admirably suitable as a reduction gear for use in connection with high speed prime movers, such as high speed turbines.

The pinion 16 and gear 18 are respectively mounted on parallel shafts 19 and 20 which are journaled preferably in sleeve bearing 21 secured in the housing 16. The shaft 19 which constitutes the input shaft of the unit projects externally from the housing 16 and is provided with means such as a keyway 22 for coupling the shaft to the prime mover (not shown). The shaft 20 which serves to couple the input and output stages projects into the housing 1 in axial alignment with the shaft 5 and is operatively connected thereto by means of the coupling element 15.

The unit may be lubricated by means of a pressure lubricating system in which oil is supplied under pressure from a pump 23 driven from the shaft 20, to the operating parts of the unit and thence to a sump 24 formed in the lower portion of the housing 1 from which it may be returned to the pump in the usual manner.

To provide a frictionless seal for the lower part of the housing 1 where the shaft 12 projects therethrough, I provide a dam type seal comprising a flanged sleeve 25 which is secured to the bottom wall of the housing and extends upwardly into the quill 4, surrounding the shaft 12, a sufficient distance to project above the level of the oil in the sump.

The operation of the transmission unit is believed obvious from the above, it being thought sufficient only to bring out that the high rotational speed of the input shaft 19 will be reduced by means of the input gears 17 and 18 to a speed commensurate to that at which the bevel gears 2 and 3 may operate efficiently and at a low noise level.

Figure 2:
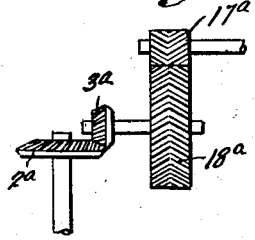
Figure 2 is a diagrammatic illustration of a modified arrangement of gearing.

A modified arrangement of gearing diagrammatically illustrated in Fig. 2 is similar to that shown in Fig. 1 and consists of a speed reducing input stage of helical gears 17A and 18A and an output stage of bevel gears 2A and 3A. In this instance, however, the output stage of bevel gears constitutes an additional speed reducing stage and finds use when the desired overall speed reduction is such as to make the reduction in the first stage impractical.

Figure 3:
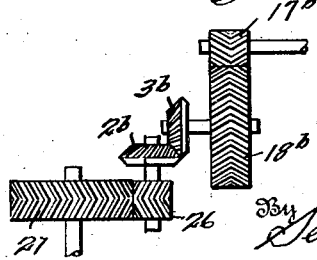
Figure 3 is a diagrammatic illustration of another modified arrangement of gearing.

It is within the concept of this invention to also provide for utilizing bevel gears in the transmission of power from high input speeds where high output speeds are also required. In such a situation, I employ a three stage gear arrangement, such as diagrammatically shown in Fig. 3, and consisting of a speed reducing input stage of helical gears 17B and 18B, an intermediate stage of bevel gears 3B and 2B, and an output stage of speed increasing helical gears 26 and 27. In the arrangement shown, the input and output stages are of equal ratio, to transmit power at the input speed. However, the output ratio may be obviously varied to obtain an increase in output speed over input speed if desired. In this modification the input speed is reduced through the gears 17B and 18B to a proper operating speed for the bevel gears 2B and 3B and then stepped up again to the input speed through the intermeshing gears 26 and 27.

There are many operations and installations requiring the transmission of power through intersecting shafts where the speed ratios are such that only beveled gearing can be used. The use of bevel gears have heretofore been impracticable, however, because of the operating limitations and deficiencies of such gears and because of the availability of only high speed power. By means of the multi-stage units constructed in accordance with the concept of this invention, employing gearing in the input stage which is suitable for high speed operations, I am enabled to efficiently employ bevel gears in the transmission of power at high input speeds. Thus, by first reducing high input speed to speed commensurate with the efficient operation of bevel gears, the field of use of such gears is greatly broadened and the art materially advanced.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claim.

I claim:

A right angle power transmission unit comprising a housing, a pair of intermeshing bevel gears therein, a rotatable hollow quill journaled at opposite ends thereof in the housing and adapted to be driven by one of said bevel gears, a drive shaft journaled in the housing and disposed at right angles to the quill and adapted to drive the other bevel gear, an input shaft journaled in the housing at right angles to said quill, a counter-shaft journaled in the housing parallel with said input shaft and in axial alignment with the drive shaft, speed reducing means including a helical pinion carried by the input shaft and a helical gear carried by the counter shaft and meshing with said pinion, coupling means connecting the counter shaft and drive shaft, a floating output shaft extending axially through said quill, and a driving connection between said quill and output shaft, said driving connection comprising a first disc member keyed to the quill, a second disc member keyed to the output shaft, and shearable means connecting the first and second disc members.

JOSEF Y. DAHLSTRAND.